H. M. A. MILLER.
TIRE GUARD.
APPLICATION FILED APR. 5, 1921.
1,387,797.
Patented Aug. 16, 1921.
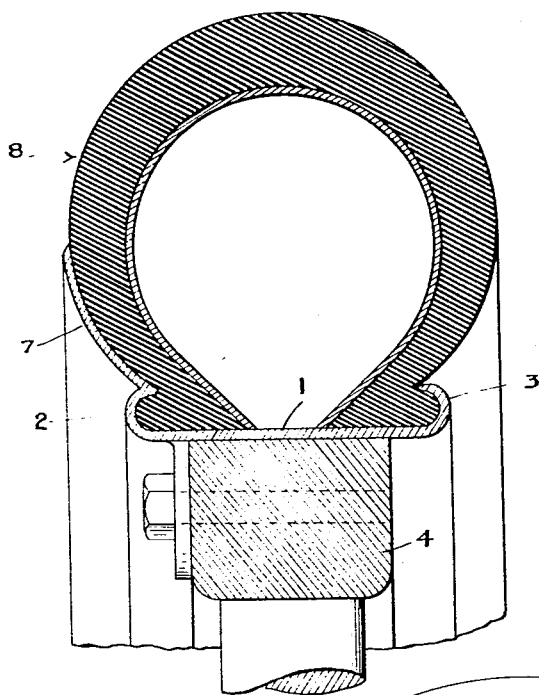
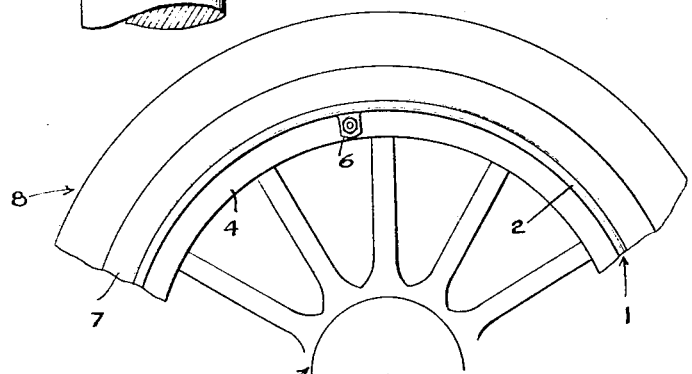
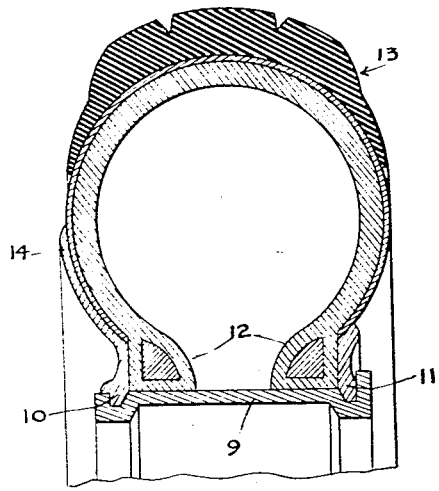
INVENTOR
H. M. A. MILLER
BY
ATT'YS.

UNITED STATES PATENT OFFICE.

HENRY M. A. MILLER, OF SAN FRANCISCO, CALIFORNIA.

TIRE-GUARD.

1,387,797.     Specification of Letters Patent.     Patented Aug. 16, 1921.

Application filed April 5, 1921. Serial No. 458,802.

*To all whom it may concern:*

Be it known that I, HENRY M. A. MILLER, a citizen of the United States, residing at San Francisco, in the county of San Francisco and State of California, have invented new and useful Improvements in Tire-Guards, of which the following is a specification.

This invention relates to means for protecting or guarding vehicle tires particularly of the pneumatic type from being injured or unduly worn incident to contact along the outer sides of said tires with curbing or other objects adjacent to which the vehicle is run.

The present style of vehicle tire projects laterally beyond the rim to such an extent that when the tire vehicle is run close to curbing or other objects, as in parking and in leaving a parking point along a street or road, the unprotected outer side of the tire frequently rubs against the curbing or other object and either cuts the tire or causes the material thereof to be unduly worn away. This abrasive action occurring frequently soon causes the tire to deteriorate and weaken and the life thereof is greatly reduced. Tires thus worn or scraped away on the sides are more subject to "blow outs" and punctures and likewise will cause the inner tubes to be pinched or punctured more readily.

Taking into consideration the difficulties and disadvantages attending the use of the present style of rim and tire it is the primary object of my invention to eliminate such difficulties and disadvantages and I accomplish this by incorporating with the tire rim structure a guard member which will extend from the base of the tire, or in other words, from the rim structure outwardly on the outer side of the tire throughout the circumference thereof, to such an extent that said guard will engage the curbing or other object, in advance of the outer side of the tire and thereby protect the same from injury and undue wear.

The invention further consists in guard means of the character described which will be simple as to construction, inexpensive, and capable of being attached to, or adapted for use in connection with various makes of tires and for rims without necessitating material or costly changes in the construction of such rims or tires, it being possible to make the guard an integral part of the rim flange, or as a separate element, or an integral part of the tire locking ring. I wish it understood that any other form of guard means capable of producing the results desired and as hereinbefore pointed out may be employed and I do not limit myself to the specific structure here shown.

The invention posesses other advantages and features some of which, with the foregoing will be set forth at length in the following description, where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claim may be embodied in a plurality of forms.

Referring to the drawings:

Figure 1 is an enlarged fragmentary vertical sectional view taken through a tire and rim showing a part of the wheel and illustrating the guard means of the invention in section, and as it would appear when in use.

Fig. 2 is a fragmentary front elevation of a vehicle wheel with my invention incorporated therewith.

Fig. 3 is a fragmentary vehicle sectional view of a tire and rim of different construction, showing a modified form of my invention.

In carrying out one embodiment of my invention, I employ a rim 1 having curled retaining flanges 2 and 3, the rim being held on the felly 4 of the wheel 5 part of which only is shown, by the usual lugs 6. On the outer flange 2 I provide an annular guard member 7 which is preferably formed integral with the upper edge of said flange but may be welded or otherwise secured thereto if desired. This guard member is preferably formed of a suitable thin, light, resilient but tough and strong metal and is of arcuate form in cross section so as to engage and conform closely to the curved outer side of the tire 8. The width of the guard is such that its outer edge will be at a point approximately one-half of the distance between the tread of tire and the base thereof, said outer edge being spaced inwardly from the tread of the tire. The object is to have the guard extend over that portion of the outer side of the tire which projects laterally beyond the rim and which would ordinarily come into contact with and scrape the curbing or other objects when the vehicle is run close to said curbing or objects. Therefore as long as this is accomplished the degree of the outward extension of the guard is immaterial.

With the wheels, or better the tires of a vehicle equipped with the guards of this invention, it will be seen that all undue wear of and injury to the tires such as is occasioned incident to the scraping of the sides of the ordinary tires are prevented and eliminated whereby the tires will have longer life. The guard in being resilient will give under impact or pressure and will not be as apt to break or damage the tire. It will be noted that the guard plate 7 is smooth and of substantially the same thickness throughout, except at the outer edge thereof, which edge is preferably beveled inwardly or reduced so as to be somewhat thinner than the main portion of the guard. Thus there is no projecting portion or protuberance or bead which would encounter the curbing. The inner side of the plate throughout its entire area is closely engaged with the tire.

Referring to Fig. 3 wherein I have shown a modified form of my invention the rim 9 is of the type having tire locking or retaining rings 10 and 11 fitted into the rim so as to engage and hold the heads 12 of the tire 13 in place. The outer ring 10 carries the guard 14 of my invention, which guard is of the same size shape and arrangement as the guard of the previously described form of the invention. This guard engages and conforms to the outer side of the tire throughout the circumference of the tire and projects outwardly sufficient to prevent the outer side of the tire from scraping against the curbing or other objects.

The guard is preferably integral with the ring but may be welded or otherwise secured thereto as desired.

I claim:—

Means for protecting or guarding the outer side of a vehicle tire from being injured or unduly worn incident to its contact with curbing or other objects, which means comprises a thin, resilient, annular and smooth metal guard plate adapted to be carried by the rim of a tire and to extend around the outer side of and in close engagement with the outer side of the tire throughout the entire area of the inner side of said guard member, the outer edge of said guard member being of less thickness than the remaining portion thereof and disposed approximately half way between the base of the tire and the tread portion thereof.

HENRY M. A. MILLER.